(12) United States Patent
Tillotson

(10) Patent No.: US 11,217,356 B2
(45) Date of Patent: Jan. 4, 2022

(54) RADIOISOTOPE POWER SOURCE

(71) Applicant: The Boeing Company, Chicago, IL (US)

(72) Inventor: Brian Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 16/457,141

(22) Filed: Jun. 28, 2019

(65) Prior Publication Data

US 2020/0411207 A1  Dec. 31, 2020

(51) Int. Cl.
| | |
|---|---|
| *G21H 1/10* | (2006.01) |
| *G21H 1/00* | (2006.01) |
| *B60L 50/90* | (2019.01) |
| *G05D 1/10* | (2006.01) |
| *G21G 1/00* | (2006.01) |
| *G21G 4/06* | (2006.01) |

(52) U.S. Cl.
CPC ............ *G21H 1/103* (2013.01); *G21H 1/00* (2013.01); *B60L 50/90* (2019.02); *G05D 1/10* (2013.01); *G21G 1/00* (2013.01); *G21G 4/06* (2013.01)

(58) Field of Classification Search
CPC ............ G21H 1/00; G21H 1/10; G21H 1/103; G21H 1/106; B60L 50/90; G21G 1/00; G21G 4/06

USPC .................................................. 310/306, 307
See application file for complete search history.

(56) References Cited

U.S. PATENT DOCUMENTS

| | | | |
|---|---|---|---|
| 3,884,718 A | 5/1975 | Deaton et al. | |
| 8,294,023 B2 | 10/2012 | Clothier et al. | |
| 8,788,119 B2 | 7/2014 | Tillotson et al. | |
| 10,269,506 B1 | 4/2019 | Tartivita | |
| 2019/0047842 A1 | 2/2019 | Tillotson et al. | |
| 2019/0047843 A1 | 2/2019 | Tillotson et al. | |
| 2019/0393394 A1* | 12/2019 | Moon | H01L 35/26 |

FOREIGN PATENT DOCUMENTS

WO     2018044192 A1     3/2018

OTHER PUBLICATIONS

Search Report for related European Application No. 20182321.8; dated Nov. 3, 2020.

* cited by examiner

*Primary Examiner* — Quyen P Leung
*Assistant Examiner* — Eric Johnson
(74) *Attorney, Agent, or Firm* — Quinn IP Law

(57) ABSTRACT

A radioisotope power source is disclosed. In one embodiment, the power source includes a dielectric liquid held within a vessel, a radioisotope material dissolved as an ionic salt within the dielectric liquid thereby forming an ionic salt solution, and a thermal-to-electric power conversion system configured to receive thermal heat generated from the decay of the radioisotope material and to generate electrical power.

20 Claims, 4 Drawing Sheets

RADIOISOTOPE POWER SOURCE

CROSS REFERENCE TO RELATED APPLICATIONS

This paragraph is reserved.

FIELD

The present disclosure relates generally to radioisotope power sources for use in various vehicles. Example vehicles include satellites, undersea vehicles, and the like.

BACKGROUND

The design objectives of various vehicles make long-lasting power supplies a desirable option. For example, satellites launched to outer space or deep-sea submersibles may be unable to be reached frequently for maintenance, if ever. As such, power supplies must be functional for as long as a maintenance interval or the expected serviceable life of the vehicle.

The inaccessibility of these vehicles allows for use of radioisotope power supplies while reducing risks associated with radiation exposure. However, radioisotopes have half-lives, which reduce an effective thermal output for a given quantity of a radioisotope by a factor of fifty-percent each half-life. Further, many thermal-to-electric power generation systems lose efficiency when exposed to temperatures outside of ideal operating temperature bands. As such, it is desirable to have radioisotope power sources able to operate for extended durations with a near constant electrical power output.

SUMMARY

In accordance with one aspect of the present disclosure the power source includes a dielectric liquid held within a vessel, a radioisotope material dissolved as an ionic salt within the dielectric liquid thereby forming an ionic salt solution, and a thermal-to-electric power conversion system configured to receive thermal heat generated from the decay of the radioisotope material and to generate electrical power.

In accordance with another aspect of the present disclosure, a power source for a vehicle is provided for. The power source includes a dielectric liquid held within a vessel having a first end and a second end opposite the first end. The power source further includes a radioisotope material, dissolved as an ionic salt within the dielectric liquid, thereby forming an ionic salt solution. A first electrode is disposed on the first end of the vessel and a second electrode is disposed on the second end of the vessel. An electric power supply is in communication with the first and second electrodes. The electric power supply is capable of providing a positive electrical charge to the first electrode and a negative electrical charge to the second electrode. A thermal-to-electric power conversion system is disposed on one of the first end or the second end based at least in part on an ionic charge of the radioisotope material. The thermal-to-electric power conversion system receives thermal heat generated from the decay of the radioisotope material to generate electrical power for an electrical load of the vehicle.

In accordance with yet another aspect of the present disclosure, a method of operating a power source is provided for. The method includes dissolving a radioisotope material as an ionic salt in a dielectric liquid contained within a vessel to form an ionic salt solution, applying a positive electrical charge to a first end of the vessel and applying a negative electrical charge to a second end of the vessel opposite the first end of the vessel, and generating electrical power from a thermal-to-electric power conversion system disposed on either one of the first end of the vessel and the second end of the vessel based at least in part on an ionic charge of the radioisotope material.

The features, functions, and advantages disclosed herein can be achieved independently in various embodiments or may be combined in yet other embodiments, the details of which may be better appreciated with reference to the following description and drawings.

It should be understood that the drawings are not necessarily to scale and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both methods and devices for carrying out the disclosure. The actual scope of the disclosure is as defined by the appended claims.

Figure 1:
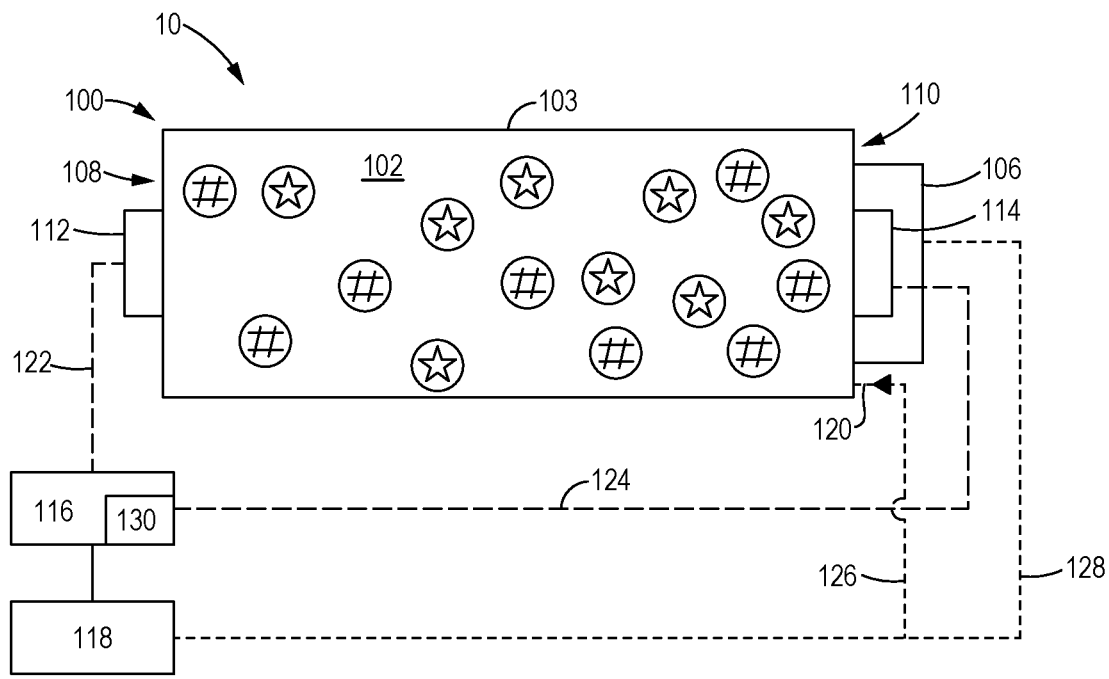
FIG. 1 is a schematic overview of a power source, in accordance with the present disclosure.

Referring to FIG. 1, FIG. 1 is a schematic overview of a power source, in accordance with the present disclosure. In particular, the schematic overview 10 depicts a power source 100 that includes a dielectric liquid 102 held within a vessel 103. The vessel 103 may have a variety of shapes. As depicted in the schematic overview 10, the vessel 103 maybe cylindrical or a rectangular prism, however other shapes are envisioned based on form-factors available on a host vehicle.

The power source 100 includes, or alternatively is configured to be loaded with, a radioisotope material 104, dissolved as an ionic salt (104-1, 104-2) within the dielectric liquid 102, thereby forming an ionic salt solution. As depicted in FIG. 1, the radioisotope material 104 separates into cations 104-1 and anions 104-2 when dissolved into the dielectric liquid 102. The cations 104-1 and anions 104-2 are generally evenly distributed throughout the vessel 103.

The dielectric liquid 102 is selected based on various design considerations. Example selections of a dielectric liquid 102 may be water, glycerol, formamide, and propylene glycol. The design considerations for selection of the dielectric liquid 102 include the ability to dissolve the radioisotope material 104 to form the ionic salt solution, the boiling temperature at the operating pressure within the vessel 103, corrosion considerations with the selected material of the vessel 103, and the like.

In various embodiments, the contents of the vessel 103 (e.g., the dielectric liquid 102 and the ionic salt solution) may be pressurized to increase the boiling point of the dielectric liquid 102 above that of the operational temperature of a thermal-to-electric power conversion system 106.

In one embodiment, the radioisotope material 104 is a salt made with Strontium-90. Thus, when dissolved, the cation 104-1 is the Strontium-90 ion with a +2 electrical charge. The anion 104-2 may be selected to be any appropriate ion suitable to form an ionic salt with Strontium-90. Strontium-90 is a radioactive isotope of Strontium produced by nuclear fission and has a half-life of approximately 28.8 years. It undergoes $\beta^-$ decay into Yttrium-90, with a decay energy of 0.546 MeV. In an embodiment with the radioisotope material 104 being Strontium-90 having a +2 ionic charge, the thermal-to-electric power conversion system 106 is disposed on the second end 110 with the second electrode 114 configured to receive the negative electrical charge 124. In one non-limiting example, the magnitude of the positive and negative electrical charges may be approximately 100 VDC.

Other selections of radioisotope material 104 may be used. For example, the radioisotope material 104 may be selected to be either Cesium-137, Cobalt-60, or any other suitable radioisotope material. Aspects to consider when selecting the radioisotope material 104 include the half-life, the type of radioactive decay, the electrical charge of the ions, the ability to dissolve into the selected dielectric liquid 102, the availability of the radioisotope material 104, and the like.

It is envisioned that the radioisotope material 104 may be added to the vessel 103 after the power source 100 is constructed, but before the power source 100 is placed into operation. This may provide for easier storage options of the power source 100 when it does not contain a radioisotope (e.g., no radiation controls may be required for a power source 100 not yet loaded with a radioisotope) as compared to a power source 100 that does include the radioisotope material 104. Further, this may extend the operational life of the power source 100 by avoiding decay of the radioisotope material 104 while the power source 100 is placed in storage after it is manufactured but before it is placed into operation. Thus, it is expected that a power source 100 may be manufactured without loading either one or both of the dielectric liquid 102 the radioisotope material 104 until just prior to being placed into operation.

The power source 100 may also include a thermal-to-electric power conversion system 106 configured to receive thermal heat 512 generated from the decay of the radioisotope material 104 in order to generate electrical power 128. One example thermal-to-electric power conversion system 106 that may be used in the power source 100 is a Peltier device. The thermal-to-electric power conversion system 106 may operate with improved efficiency when exposed to temperatures in a first temperature band. Temperatures outside of this first temperature band may result in reduced efficiency in converting the thermal energy produced by the decay of the radioisotope into electrical power.

As depicted throughout the Figures, the power source 100 includes a first end 108, generally depicted on the left side of the Figures, and a second end 110, that is opposite the first end 108, and is generally depicted on the right side of the Figures. A first electrode 112 is disposed on the first end 108 of the vessel 103, and a second electrode 114 is disposed on the second end 110 of the vessel 103.

An electric power supply 116 is in communication with the first electrode 112 and the second electrode 114. The electric power supply 116 is capable of providing a positive electrical charge 122 to the first electrode 112 and a negative electrical charge 124 to the second electrode 114. The electrodes 112, 114 are able to apply an electric charge to the opposing ends 108, 110, of the vessel in order to attract opposite-charged ions dissolved within the dielectric liquid 102 towards the respective electrodes 112, 114.

The thermal-to-electric power conversion system 106 is disposed on either one of the first end 108 of the vessel 103 and the second end 108 of the vessel 103 based at least in part on an ionic charge of the radioisotope material 104. As shown in FIG. 1, the thermal-to-electric power conversion system 106 is disposed on the second end 110 of the vessel 103. In embodiments with a positively charged radioisotope 104, a negative electrical charge is applied via the second electrode 114 to attract the positively charged radioisotope 104 to the second end 110 of the vessel 103.

By way of convention, this application considers positively charged radioisotopes being attracted to a negative electrical charge 124 being applied to the second electrode 114 at the second end 110 of the vessel 103, although any of these parameters may be reversed. For example, a negatively charged radioisotope 104 being attracted to a positive electrical charge being applied to the second electrode 114, or the like.

The electric power supply 116 may be controlled by a power-supply controller 118 so that the electric power supply 116 is configured to adjust a magnitude of both the positive electrical charge 122 and the negative electrical charge 124 applied via the first and second electrodes 112, 114, respectively. The electric power supply 116 is controlled to maintain an operational temperature of the ionic salt solution at either one of the first end 1080 of the vessel 103 or the second end 110 of the vessel 103 that includes the thermal-to-electric power conversion system 106. The power-supply controller 118 may be configured to maintain the operational temperature within the first temperature band to improve efficiency of the thermal-to-electric power conversion system. In some embodiments, the first temperature band may be approximately 400° C.+/−50° C., although other temperature bands may be used as suitable for the design constraints of the power source 100 and the associated vehicle and electrical loads.

In some embodiments, the electric power supply 116 includes a switch 130 that is configured to selectively interrupt or permit the positive electrical charge 122 and the negative electrical charge 124, respectively, to the first and second electrodes 112, 114. The switch 130 may interrupt the electrical charge from being applied to the electrodes to further extend an operational life of the power source 100. This may reduce the formation of corrosion on various components (e.g., the electrodes), that may occur at higher temperatures and electrical potentials in the presence of the applied electrical charges.

The positive electrical charge 122 and the negative electrical charge 124 may be applied to the first end 108 and the second end 110 of the vessel 103, respectively, responsive to receiving an operational command signal from the associated vehicle which the power source 100 is installed within and configured to provide electrical power 128.

In some embodiments, the power source 100 further includes a temperature monitoring device 120 that is configured to monitor the temperature of the ionic solution in the vicinity of the thermal-to-electric power conversion system 106. The temperature monitoring device 120 provides a temperature reading 126 to the power-supply controller 118. The temperature reading 126 may be used by the power-supply controller 118 to control the operational temperature of the ionic solution by way of altering the magnitude of the electrical charges 122, 124 applied to the ends 108, 110 of the vessel 103.

Figure 2:
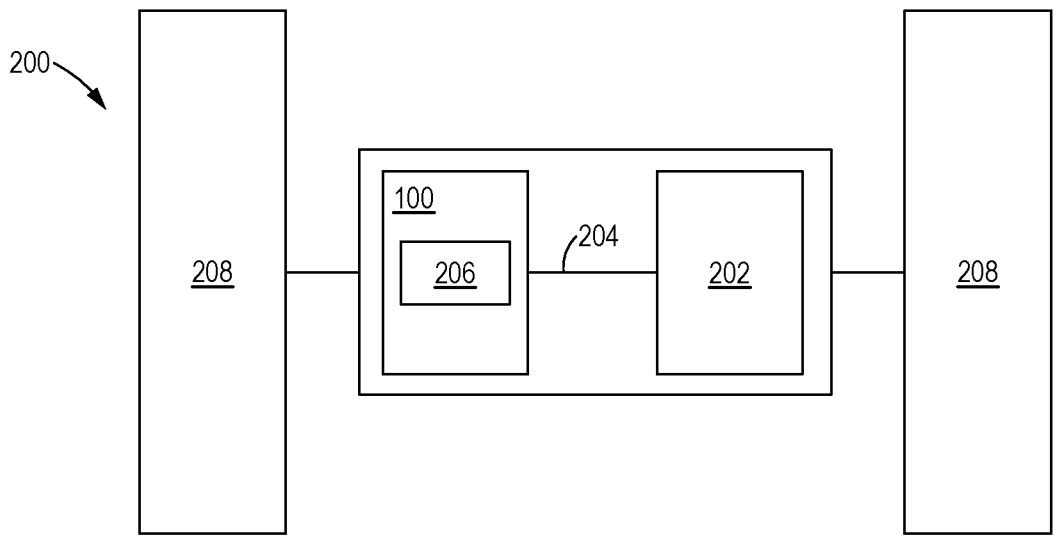
FIG. 2 is a schematic overview of a vehicle having the power source of FIG. 1, in accordance with the present disclosure.

FIG. 2 is a schematic overview of a vehicle having the power source of FIG. 1, in accordance with the present disclosure. In particular, FIG. 2 depicts the power source 100 for a vehicle 200. The vehicle 200 is depicted as a satellite, although other vehicles may be used. The vehicle 200 includes the power source 100 having a means 206 to control the power source 100, a vehicle controller 202 operably connected to the power source 100 via the link 204. The vehicle controller 202 provides for electrical flow paths for the electrical power produced by the power source 100 to be provided to the electrical loads 208.

The power source 100 in the vehicle 200 may be the power source 100 described in conjunction with FIG. 1. Here, the power source 100 includes the dielectric liquid 102, held within a vessel 103 having a first end 108 and a second end 110 opposite the first end 108. A radioisotope material 104 is dissolved as an ionic salt forming the ions 104-1, 104-2 within the dielectric liquid 102, thereby forming an ionic salt solution. A first electrode 112 is disposed on the first end 108 of the vessel 103 and a second electrode 114 is disposed on the second end 110 of the vessel 103. An electric power supply 116 is in communication with the first and second electrodes 112, 114. The electric power supply 116 is capable of providing a positive electrical charge 122 to the first electrode 112 and a negative electrical charge 124 to the second electrode 114. A thermal-to-electric power conversion system 106 is disposed on one of the first end 108 or the second end 110 based at least in part on an ionic charge of the radioisotope material 104. The thermal-to-electric power conversion system 106 is configured to receive thermal heat 512 generated from the decay of the radioisotope material 104 and to generate electrical power 128 for an electrical load 208 of the vehicle 200.

In operation, the power source 100 provides electrical power 128 to the electrical loads 208 as determined by the vehicle controller 202. The power source 100 may include a means 206 to control an operational temperature of the ionic salt solution adjacent to the thermal-to-electric power conversion system 106. Although discussed more fully below, the means to control the operational temperature may be a power-supply controller 118 configured to monitor the operational temperature of the ionic salt solution and to control the magnitudes of the positive and negative electrical charges, heat-driven diffusion of the radioisotope material 104, ionization by radioactive emissions that controls a conductivity of the dielectric liquid, monitoring radiation emitted from the power source 100, monitoring the electrical power output of the thermal-to-electric power conversion system 106, and the like.

Figure 3:
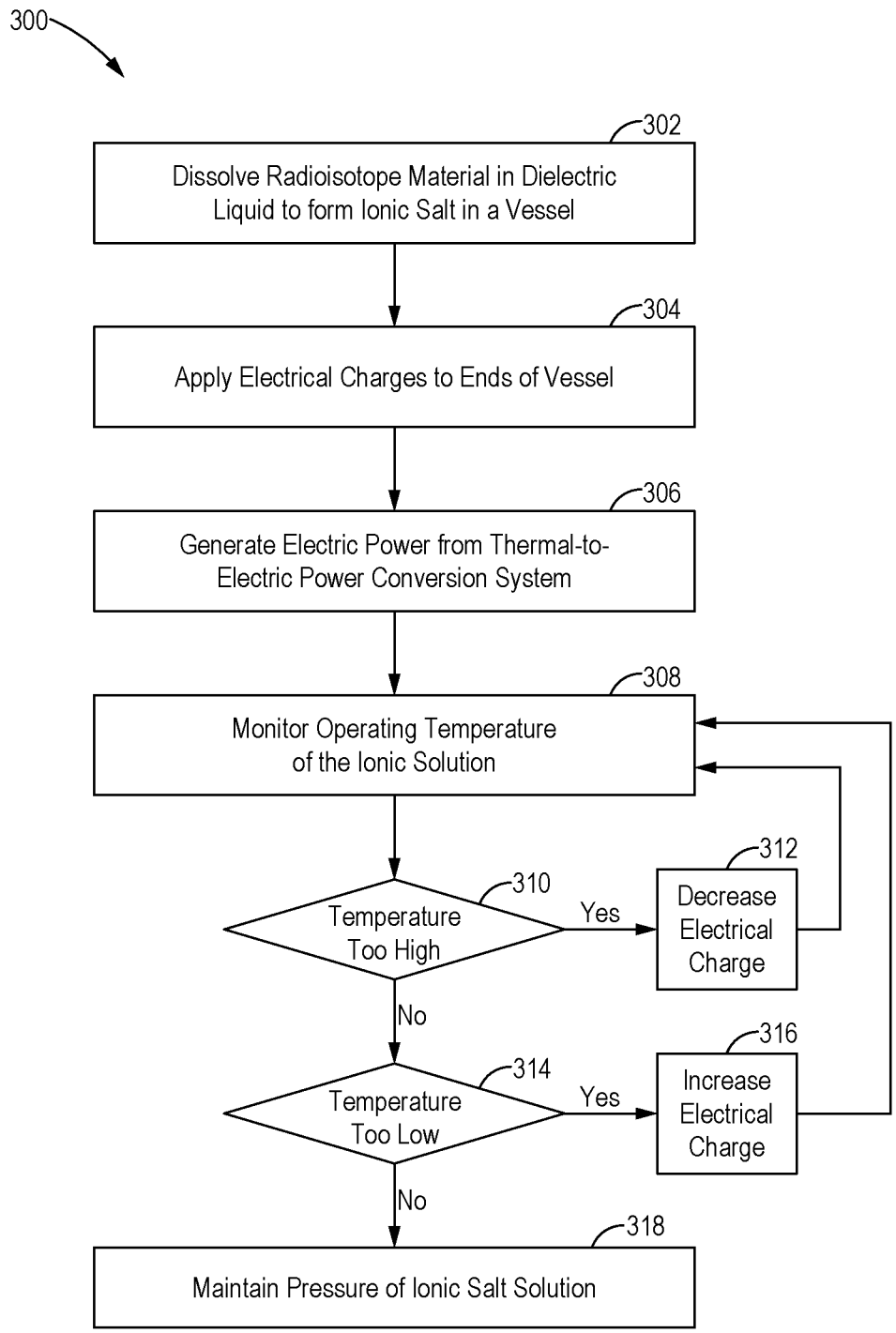
FIG. 3 depicts a flowchart illustrating an exemplary method of operating a power source, in accordance with the present disclosure.

FIG. 3 depicts a flowchart illustrating an exemplary method of operating a power source, in accordance with the present disclosure. In particular, FIG. 3 depicts the method 300 that includes dissolving the radioisotope material in a dielectric liquid to form an ionic salt in a vessel at block 302, applying electrical charges to the ends of the vessel at block 304, generating electric power from a thermal-to-electric power conversion system at block 306 and monitoring an operational temperature of the ionic solution at block 308. If at block 310 the temperature is too high, the electrical charge is lowered at block 312, and the monitoring continues at block 308. However, if at block 314 the temperature is too low, the electrical charge is raised at block 316, and the monitoring continues at block 308. At block 318, the pressure of the ionic salt solution is maintained.

INDUSTRIAL APPLICABILITY

The power source 100 may be used in a variety of applications. For example, it may provide electrical power to satellites or deep-sea submersibles, or other similar vehicles. The teachings of this disclosure allow for operational temperatures of the power source 100 to be maintained within a constant temperature band for several half-lives of the radioisotope as compared to conventional radioisotope power sources. Thus, the power source 100 may be able to provide a constant electrical power output on the order of 1 kW (although other power outputs are certainly envisioned), over a long period of time. The power source 100 may also experience a reduction in weight as compared to conventional radioisotope power sources by requiring less overall radioactive material 104 to maintain a constant thermal output.

In some embodiments, the radioisotope material 104 is selected to have a half-life of at least two years. It is expected that a power source disclosed herein may provide for a constant output of electrical power for at least three half-lives of the radioisotope material 104. Thus, for a radioisotope having a 2 year half-life, it is expected that the power source 100 will have an operational lifespan of at least 6 years.

Figure 4:
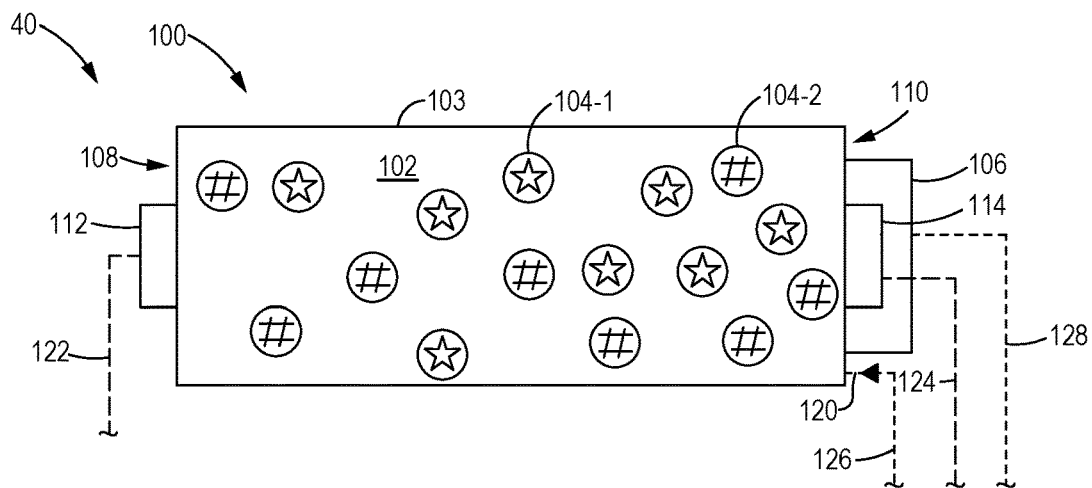
FIG. 4 depicts the power source at an initial un-energized state, in accordance with the present disclosure.
Figure 5:
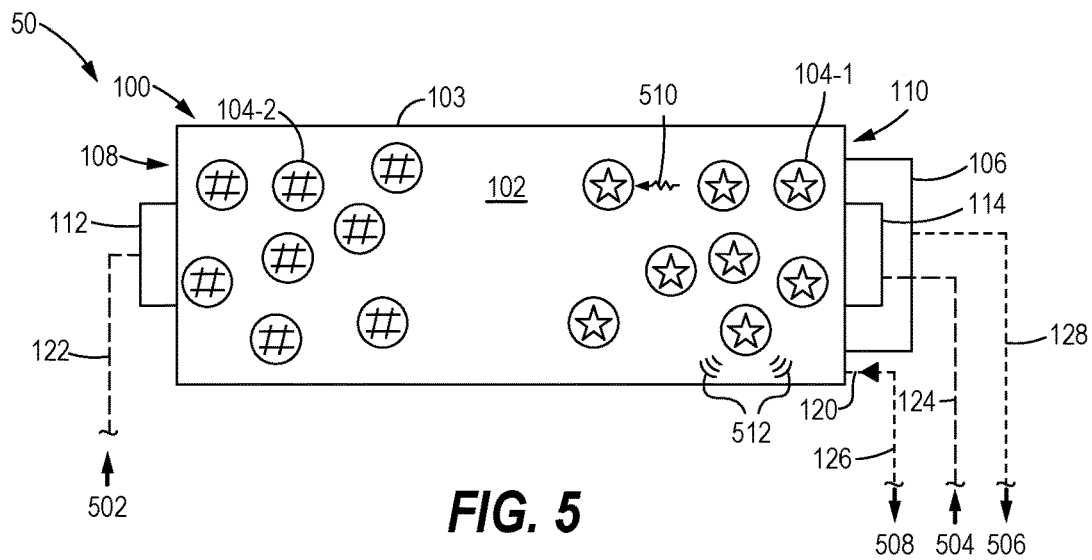
FIG. 5 depicts the power source at an initial energized state, in accordance with the present disclosure.
Figure 6:
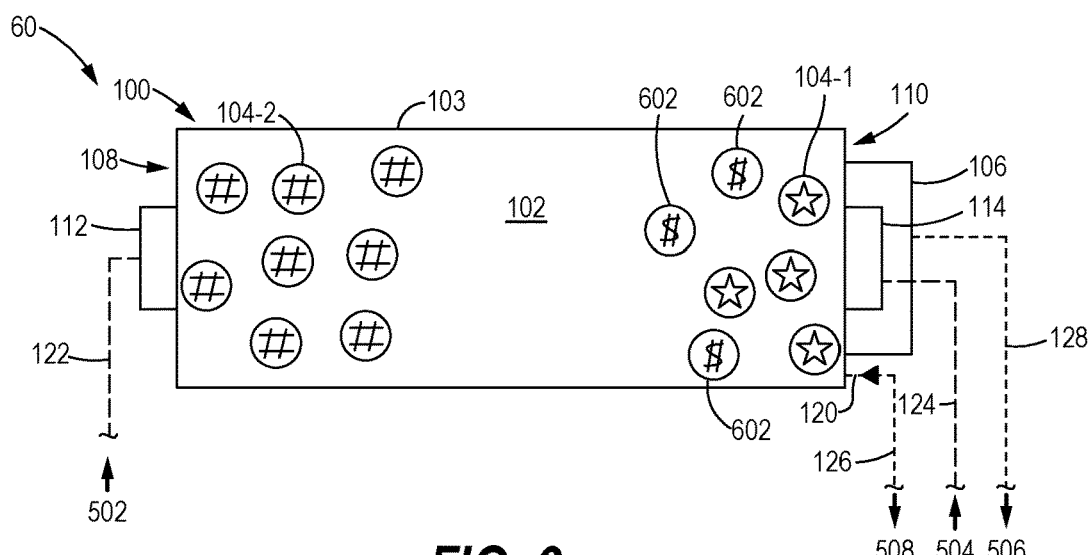
FIG. 6 depicts the power source after a first half-life has elapsed and in an energized state, in accordance with the present disclosure.
Figure 7:
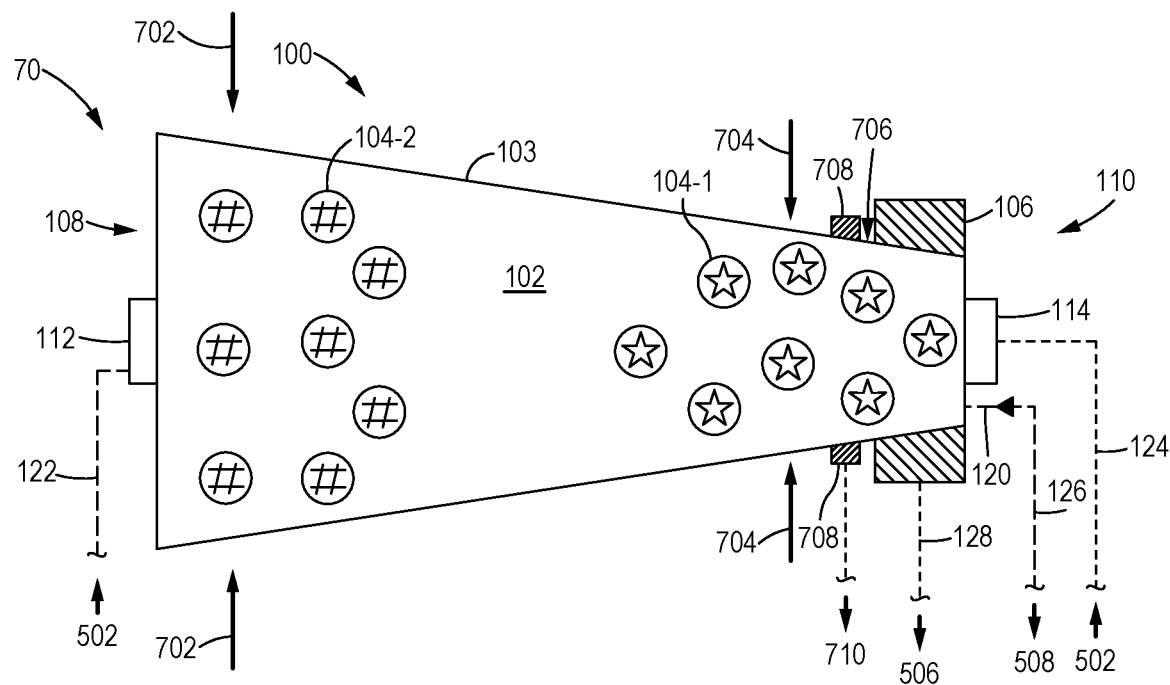
FIG. 7 depicts a power source having a frustum-shape, in accordance with the present disclosure.

By way of example, the method 300 of FIG. 3 may be used with the power source 100 of FIG. 1, as explained more fully below with the discussion of FIGS. 4-7. FIGS. 4-6 depict the power source 100 at various states, and FIG. 7 depicts the power source 700 having a vessel 103 with a frustum-shape.

Returning to FIG. 4, it depicts the power source 100 at an initial un-energized state, in accordance with the present disclosure. In particular, FIG. 4 depicts the schematic overview 40 of the power source 100 at an initial un-energized state. In the following Figures, components with similar reference numbers serve the same functions as described throughout.

From block 302 of the method 300, the radioisotope material 104 is dissolved as an ionic salt in the dielectric liquid 102 that is contained within the vessel 103. The radioisotope material 104 forms an ionic salt solution, as represented by the cations 104-1 and the anions 104-2. In the initial un-energized state, such as when no electrical charge is being provided to the electrodes 112, 114, for example by way of the switch 130 prohibiting the electrical charges 122, 124 from being applied to the electrodes 112, 114, the cations 104-1 and anions 104-2 of the ionic salt solution disseminate throughout the dielectric liquid 102 uniformly. In the embodiments discussed in FIGS. 4-6, the cation is the radioisotope material 104 of Strontium-90.

The cation 104-1 undergoes radioactive decay and produces thermal heat throughout the complete volume of the vessel 103. Because the Strontium-90 ions are distributed throughout the vessel 103, the temperature at the second end 110 is lower than if the Strontium-90 ions were concentrated on the second end 110. Thus, the thermal-to-electric power conversion system 106 may be able to convert some of the residual heat from the vessel 103 into electrical power 128, but it is envisioned that the temperature of the ionic solution in the vicinity of the second end 110 would be well below the first operational temperature band and provide a low amount of electrical power 128.

FIG. 5 depicts the power source at an initial energized state, in accordance with the present disclosure. In particular, FIG. 5 depicts the schematic overview 50 of the power source 100 at an initial energized state. At block 304 of the method 300, electrical charges are applied to the ends of the vessel 103. Here, a positive electrical charge 122 is provided to the first electrode 112 at the first end 108. A negative electrical charge 124 is provided to the second electrode 114 at the second end 110. Applying these electrical charges attracts ions of the opposite electrical charge to the respective ends of the vessel 103. Here, the anions 104-2 are attracted, and concentrated, in the vicinity of the first end 108, and the cations 104-1 are attracted, and concentrated, in the vicinity of the second end 110 having the thermal-to-electric power conversion system 106.

As the cations ions 104-1 (e.g., the radioisotope Strontium-90) are attracted to the second end 110 by the negative electrical charge 124 applied via the second electrode 114, the temperature of the second end 110 of the vessel 103 will increase due to the radioactive decay of the radioisotope ions. This increased temperature causes the ions in solution to move via thermal, or heat-driven, diffusion.

This motion of the ions may be referred to as Brownian motion that results from the continuous bombardment of molecules of the surrounding medium. The heat-driven diffusion 510 serves as one means 206 to control the operational temperature of the ionic salt solution adjacent to the thermal-to-electric power conversion system. This heat-driven diffusion 510 causes the radioisotope cations 104-1 to migrate away from the hot portions of the vessel (e.g., the second end 110 when the electrical charge is applied) towards the cold portion of the vessel (e.g., towards the first end 108 when the electrical charge is applied). This serves as an intrinsic feedback mechanism to reduce the operational temperature of the ionic solution in the vicinity of the thermal-to-electric power conversion system 106.

As the radioisotope material 104 decays, it provides thermal heat 512. In the schematic overview 50, the thermal heat 512 is produced by the cations 104-1 that are concentrated toward the second end 110. This concentration of the radioisotope material 104 accumulates the thermal heat 512 to increase the temperature of the ionic solution in the vicinity of the thermal-to-electric power conversion system 106. This may raise the temperature of the ionic salt solution to be within the first temperature band to provide for efficient conversion of thermal energy to electrical power 128.

Further, in the embodiments discussed herein, the radioisotope material 104 is selected to be Strontium-90 having a +2 electrical charge. Thus, for a given applied electrical current to the electrodes, it is expected that the Strontium-90 ions would have a greater concentration in the vicinity of the associated electrode as compared to a radioisotope ion having a +1 electrical charge.

FIG. 6 depicts the power source in an energized state after a first half-life has elapsed, in accordance with the present disclosure. In particular, FIG. 6 depicts the schematic overview 60 of the energized power source 100 after a first half-life has elapsed. Although it is anticipated that the number of ions in solution would greatly exceed that which is depicted in the accompanying Figures, it can be seen that between the initially energized state of FIG. 5 to the state of the power source 100 after one half-life has elapsed in FIG. 6, the number of cations 104-1 has reduced in half due to natural radioactive decay. The radioactive emissions 602 are now present in the ionic salt solution. These radioactive emissions 602 may further serve as a means 206 to control the operational temperature of the ionic salt solution. These radioactive emissions 602 control a conductivity of the dielectric liquid 102. The radioactive emissions 602 may knock loose electrons from the dielectric liquid 102. This increases the non-ionic electrical conductivity of the dielectric liquid 102 near the second end 110. However, at the first end 108 with fewer radioisotope cations 104-1, the conductivity is not as altered as the second end 110.

Thus, for a fixed electrical charge applied to the electrodes 112, 114, the electric field near the second end 110 decreases compared to the electric field of the first end 108. This reduces the force driving the radioactive ions 104-1 towards the second end 110, so more of them diffuse towards the first end 108.

The combination of the heat-driven diffusion 510 and the ionization by radioactive emissions 602 allows for a nearly steady temperature at the second end 110 having the thermal-to-electric power conversion system 106, despite the decay of most of the radioisotope material 104, over a span of several half-lives. This results in radioisotope power sources that require less quantity, and weight, of radioisotope material 104 to produce the same desired electrical power output over the life of the power source 100. This may result in less regulatory controls of the power source. Further, the lighter weight of the power source 100 may be a very beneficial design aspect in satellite use cases.

FIG. 7 depicts a power source having a frustum-shape, in accordance with the present disclosure. In particular, FIG. 7 depicts the schematic overview 70 of the power source 700, which may be similar to the power source 100 discussed herein. As compared to the power source 100, the vessel 103 of the power source 700 has a frustum-shape. Thus, a cross-sectional area at 702 in the vicinity of the first end 108 is greater than a cross-sectional area 704 in the vicinity of the second end 110. The reduced cross-sectional area at the second end 110 having the thermal-to-electric power conversion system 106 may allow for a greater concentration of cations 104-1 as compared to a vessel 103 that has a uniform cross section at each end of the vessel 103.

Also, as compared to the power source 100, the power source 700 includes the thermal-to-electric power conversion system 106 that is disposed along an outer circumference 706 of the vessel 103 rather than on the far-right end. Disposing the thermal-to-electric power conversion system 106 along the outer circumference 706 may be realized in other shape vessels 103, such as the vessel 103 of the power source 100 of FIG. 1. It is further envisioned that the thermal-to-electric power conversion system 106 may be configured to enclose both an outer circumferential surface 706 and a far end in order to increase the conversion of the thermal energy into electrical power.

Additionally, the power source 100 may further include a radiation detector 708 disposed in proximity to the second end 110. The radiation detector 708 may be configured to detect the radiation produced by the cations 104-1, and provide the radiation reading 710 to the power-supply controller 118 for use in control of the operational temperature of the ionic solution. As an alternative, the power-supply controller 118 may monitor the electrical power 128 being output (e.g., the power-supply controller 118 monitoring the voltage and/or current) from the thermal-to-electric power conversion system 106 for use in controlling the operational temperature of the ionic solution.

As such, blocks 308, 310, and 314 of the method 300 may be changed as appropriate from monitoring the operational temperature of the ionic solution to monitoring either the electrical output or the radiation emitted in order to decrease the electrical charge (e.g., block 312) or increase the electrical charge (e.g., block 316) based on the radiation or electrical output being too high or too low, respectively.

It may be realized that further reduction in weight may be realized by eliminating additional and extraneous sensors from the power source 100. As such, a power source 100 may be realized with only one of a radiation detector 708, a temperature monitoring device 120, or an electrical output monitor (e.g., as monitored by the power-supply controller 118).

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A power source comprising:
a dielectric liquid, held within a vessel;
a radioisotope material, dissolved as an ionic salt within the dielectric liquid thereby forming an ionic salt solution; and
a thermal-to-electric power conversion system configured to receive thermal heat generated from the decay of the radioisotope material and to generate electrical power.

2. The power source of claim 1, further comprising:
a first electrode disposed on a first end of the vessel;
a second electrode disposed on a second end of the vessel opposite the first end of the vessel; and
an electric power supply in communication with the first and second electrodes, the electric power supply capable of providing a positive electrical charge to the first electrode and a negative electrical charge to the second electrode.

3. The power source of claim 2, wherein the thermal-to-electric power conversion system is disposed on either one of the first end of the vessel and the second end of the vessel based at least in part on an ionic charge of the radioisotope material.

4. The power source of claim 3, wherein the electric power supply comprises a controllable electric power supply configured to adjust a magnitude of both the positive electrical charge and the negative electrical charge, wherein the electric power supply is controlled to maintain an operational temperature of the ionic salt solution at the first end of the vessel or the second end of the vessel having the thermal-to-electric power conversion system.

5. The power source of claim 2, wherein the radioisotope material is Strontium-90 having a +2 ionic charge, and the thermal-to-electric power conversion system is disposed on the second end with the second electrode configured to receive the negative electrical charge.

6. The power source of claim 2, wherein the electric power supply further includes a switch configured to selectively interrupt or permit the positive electrical charge and the negative electrical charge, respectively, to the first electrode and the second electrode.

7. The power source of claim 2, wherein a first cross-sectional area near the first end is greater than a second cross-sectional area near the second end.

8. The power source of claim 1, wherein the dielectric liquid is selected from a group, the group consisting of one of water, glycerol, formamide, and propylene glycol.

9. The power source of claim 1, wherein the radioisotope material is selected from a group, the group consisting of one of Strontium-90, Cesium-137, Cobalt-60.

10. The power source of claim 1, wherein the dielectric liquid is pressurized to raise a boiling point of the dielectric liquid above an operational temperature of the thermal-to-electric power conversion system.

11. A power source for a vehicle, the power source comprising:
a dielectric liquid, held within a vessel having a first end and a second end opposite the first end;
a radioisotope material, dissolved as an ionic salt within the dielectric liquid thereby forming an ionic salt solution;
a first electrode disposed on the first end of the vessel and a second electrode disposed on the second end of the vessel;
an electric power supply in communication with the first and second electrodes, the electric power supply capable of providing a positive electrical charge to the first electrode and a negative electrical charge to the second electrode; and
a thermal-to-electric power conversion system disposed on one of the first end or the second end based at least in part on an ionic charge of the radioisotope material, the thermal-to-electric power conversion system configured to receive thermal heat generated from the decay of the radioisotope material and to generate electrical power for an electrical load of the vehicle.

12. The power source of claim 11, wherein the electric power supply further comprises a means to control an operational temperature of the ionic salt solution adjacent to the thermal-to-electric power conversion system.

13. The power source of claim 12, wherein the means to control the operational temperature comprises a power-supply controller configured to monitor the operational temperature of the ionic salt solution and to control magnitudes of the positive electrical charge and the negative electrical charge.

14. The power source of claim 12, wherein the means to control the operational temperature comprises heat-driven diffusion of the radioisotope material and ionization by radioactive emissions controlling a conductivity of the dielectric liquid at the first end of the vessel and the second end of the vessel.

15. The power source of claim 12, wherein the means to control the operational temperature is based on either one of a radiation detector measuring radiation in proximity to the second end and monitoring an electrical output of the thermal-to-electric power conversion system.

16. A method of operating a power source, the method comprising:

dissolving a radioisotope material as an ionic salt in a dielectric liquid contained within a vessel to form an ionic salt solution;

applying a positive electrical charge to a first end of the vessel and applying a negative electrical charge to a second end of the vessel opposite the first end of the vessel; and generating electrical power from a thermal-to-electric power conversion system disposed on either one of the first end of the vessel and the second end of the vessel based at least in part on an ionic charge of the radioisotope material.

17. The method of claim 16, further comprising:

monitoring an operational temperature of the ionic salt solution;

responsive to determining the operational temperature of the ionic salt solution is too high, decreasing magnitudes of the positive electrical charge and the negative electrical charge; and responsive to determining the operational temperature of the ionic salt solution is too low, increasing the magnitudes of the positive electrical charge and the negative electrical charge.

18. The method of claim 16, further comprising pressurizing the dielectric liquid to raise a boiling point of the dielectric liquid above an operational temperature of the power source.

19. The method of claim 16, wherein the positive electrical charge and the negative electrical charge are applied to the first end of the vessel and the second end of the vessel, respectively, responsive to receiving an operational command signal.

20. The method of claim 16, wherein the radioisotope material is Strontium-90.

* * * * *